(No Model.)
G. W. KRAMER.
STEERING GEAR FOR TRACTION ENGINES.
No. 503,146. Patented Aug. 15, 1893.
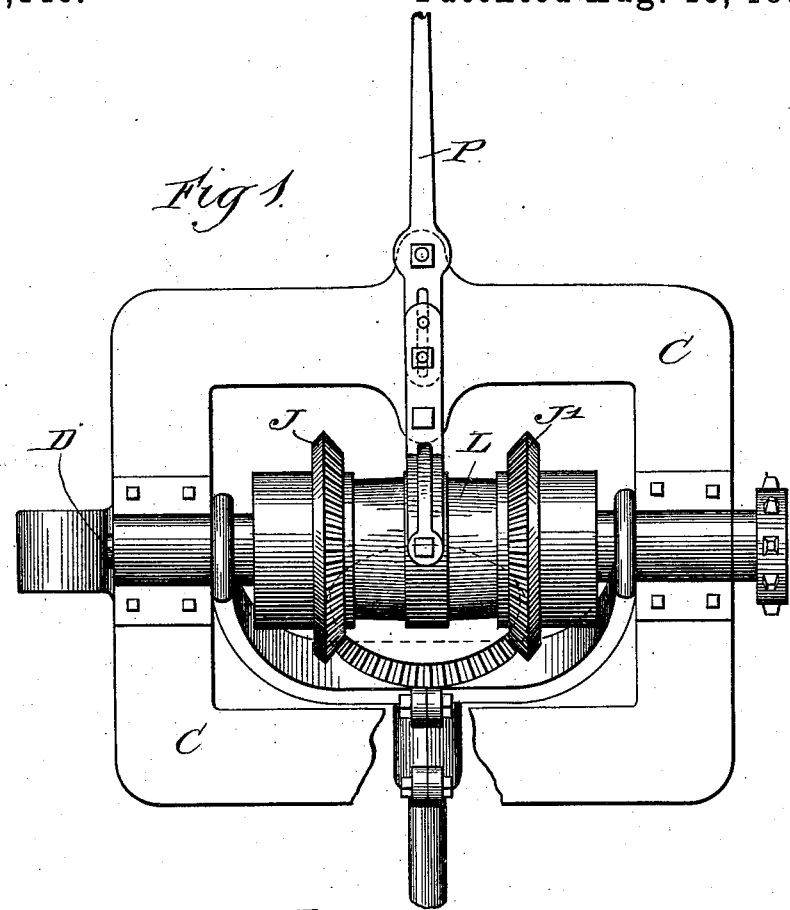
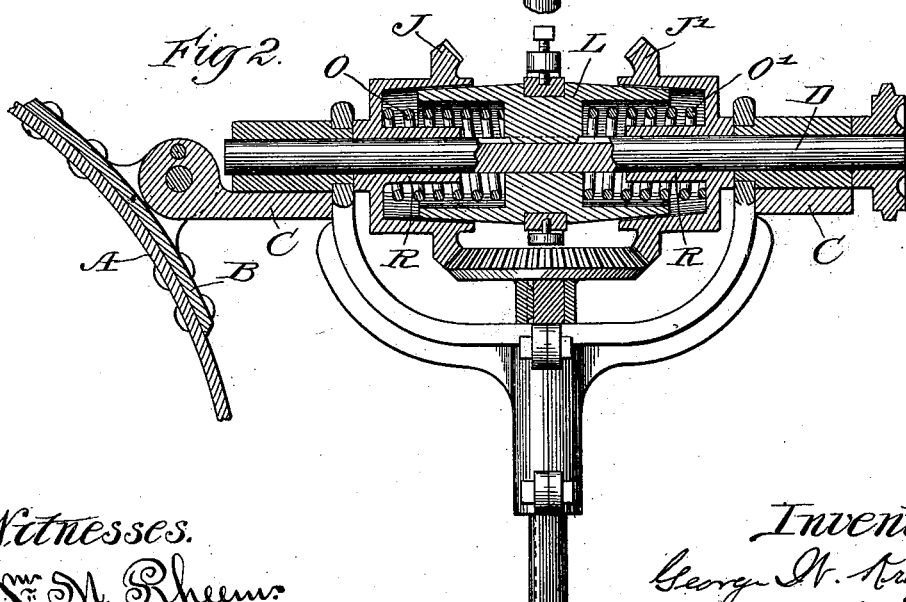

United States Patent Office.

GEORGE W. KRAMER, OF PEORIA, ILLINOIS, ASSIGNOR TO THE HART WEIGHER COMPANY, OF SAME PLACE.

STEERING-GEAR FOR TRACTION-ENGINES.

SPECIFICATION forming part of Letters Patent No. 503,146, dated August 15, 1893.

Application filed May 1, 1893. Serial No. 472,516. (No model.)

*To all whom it may concern:*

Be it known that I, GEORGE W. KRAMER, a citizen of the United States of America, residing at Peoria, county of Peoria, and State of Illinois, have invented certain new and useful Improvements in Steering-Gear for Traction-Engines, of which the following is a specification.

Referring to the accompanying drawings, wherein like reference letters indicate like or corresponding parts: Figure 1, is a top-plan of my improved device, and Fig. 2, is a vertical section of the same.

This invention is in the nature of an improvement upon the device shown, explained and claimed in an application for Letters Patent filed by me April 7th, 1892, Serial No. 428,242, and an application executed by me April 27, 1893, to be filed in the Patent Office, both being for improvements in steering gear for traction engines.

In both the applications referred to a frame C is secured to the boiler of the engine, and a shaft D, driven by the power of the engine, is supported by the frame. Two oppositely disposed beveled gears are loosely mounted upon the shaft, a clutch L upon the shaft, is moved longitudinally to engage with one or the other of the beveled gears. An intermediate beveled pinion meshes with both of said gears, and is driven to the right or to the left according to which one of said gears operates it. The rotation of the intermediate gear is communicated to the take-up drum and the front wheels of the engine turned to the right or to the left to steer it in the desired course.

This invention consists in an improved manner of assembling the parts by means of which the clutch and beveled gears are prevented from coming in accidental contact and the danger of damage from this source obviated. I accomplish this by means of a spring, preferably a coiled spring, placed at each end of the clutch between the clutch and the gears.

In the drawings A, represents the surface of the boiler; B, the plate or bracket attached thereto; C, the frame; D, the shaft; J J' the beveled gears; and L the clutch mounted on said shaft.

In the preferred form the ends of the clutch L are recessed and the beveled gears J J' are also recessed, while between the ends of the clutch and the gears are interposed the coiled springs O O'. These springs are of about equal strength and hence the clutch is held in the center between the gears J J', but not in contact with either. The action of the shifting lever P in either direction, overcomes the resistance of the opposing spring and forces the clutch into contact with the proper gear, when the engine is turned as desired. Upon releasing the lever the spring forces the clutch out of contact with the gear and relieves the engine from the operation of the steering device. In constructing the beveled gears, in this form, I prefer to construct them with a central boss, R, to give greater bearing upon the shaft. The spring may, if desired, encircle this boss, as shown in Fig. 2, and thus does not necessarily come in contact with the shaft.

It is obvious that it does not matter whether the power from the engine drives the clutch continuously and the gears are only operated when the clutch is brought in contact therewith, or whether the gears are driven continuously and the clutch driven only when brought in contact therewith. My invention is applicable to either form, and I do not limit myself to either.

Having thus described my invention, what I claim as new, and desire to secure by Letters Patent, is—

1. In a device of the kind described, a frame supported by the boiler; a shaft journaled thereon; two oppositely disposed beveled gears loosely mounted on said shaft; and a clutch mounted upon said shaft and adapted to move longitudinally to co-act with either of said gears; in combination with springs at each end of said clutch adapted to normally hold the same in a central position between the two gears, and not in contact with either; substantially as described.

2. In a device of the kind described, the frame C, the shaft D, the beveled gears J J', loosely mounted on said shaft, and the longitudinally movable clutch L, having a central recess in either end; in combination with the springs O O', arranged at the ends of the clutch within said recess and adapted to normally hold the clutch out of contact with either of said gears; substantially as described.

3. In a device of the kind described, the frame C, the shaft D, the gears J J', each having a central recess and a centrally extending boss R, and the clutch L having a central recess in each end; in combination with the springs O O', arranged at the ends of the clutch within the cavities formed, and encircling the bosses, adapted to normally hold the clutch out of contact with either of said gears; substantially as described.

GEORGE W. KRAMER.

Witnesses:
  D. S. LEE,
  W. C. HANNA.